Figure 1:
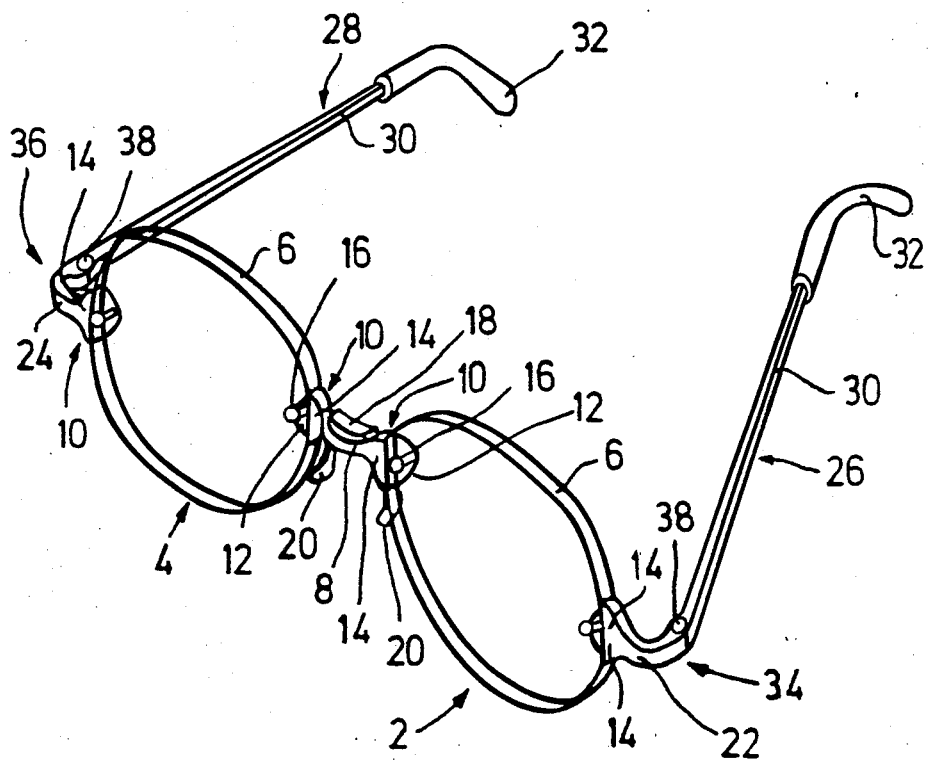

United States Patent [19]

Anger

[11] Patent Number: 4,692,001
[45] Date of Patent: Sep. 8, 1987

[54] RIMLESS SPECTACLES FOR CORRECTION PURPOSES

[76] Inventor: Wilhelm Anger, Via Brattas 4, CH-7500 St. Moritz, Switzerland

[21] Appl. No.: 660,739

[22] Filed: Oct. 15, 1984

[30] Foreign Application Priority Data

Aug. 7, 1984 [DE]  Fed. Rep. of Germany ....... 3429090

[51] Int. Cl.⁴ ........................... G02C 1/02; G02C 5/02
[52] U.S. Cl. .................................... 351/41; 351/110; 351/124
[58] Field of Search .................. 351/41, 110, 140, 124

[56] References Cited

U.S. PATENT DOCUMENTS

| | | | |
|---|---|---|---|
| 3,639,481 | 2/1972 | Innes | 351/41 |
| 4,120,848 | 10/1978 | Mori et al. | 351/41 |
| 4,135,792 | 1/1979 | Deeg et al. | 351/41 |

FOREIGN PATENT DOCUMENTS 2136802  2/1973  Fed. Rep. of Germany ...... 351/110
630619  10/1949  United Kingdom ................ 351/110

Primary Examiner—Rodney B. Bovernick

[57] ABSTRACT

Spectacles of the so-called metal-fitting type exhibits, in addition to the spectacle lenses, a bridge, two temples, two hinge pieces for the two temples, fastening devices for connecting the bridge and the hinge pieces to the lenses, and at least one bridge and a bridge mounting, whereby the mechanical, supporting connection between the bridge and the hinge pieces alone secures the spectacle lenses intermediately situated and no eyewires are present. With the possible exception of the lenses, in these spectacles all the components determining its geometry are made of plastic. By comparison to the traditional metal-fitting spectacles, in which these structural components are all made of metal, these new spectacles are lighter, safer from breaking, and susceptible of being fitted to the wearer in a simple fashion.

7 Claims, 4 Drawing Figures

RIMLESS SPECTACLES FOR CORRECTION PURPOSES

This invention relates to rimless spectacles for correction purposes.

Such rimless spectacles are known. This has to do with a type of spectacles which is also designated as metal-fitting spectacles and formerly as glass spectacles. The particularity of this type of spectacles and thus of the spectacles in accordance with this genre lies in the fact that no eyewires are prsent and that for making the mechanical connection between the bridge on the one hand and the side components on the other were solely the respective spectacle lenses situated between one of the side components and the bridge. In the know spectacles of this type the bridge, the articulation pieces, the temple and the fastening device, which is to say all the individual components responsible for the mechanical cohesion of the spectacles, together with the bridge mountings, were made of metal in order to afford sufficient firmness and rigidity to the spectacles. Owing to this, the individual components and thus the spectacles altogether were relatively expensive to produce; in addition, fitting the spectacles to the individual requirements of the person wearing them is a difficult since there is scarcely any possibility of affecting the form of the individual components except a subsequent imposition of form on the individual parts by bending them. In addition, in these known spectacles there exists a relatively high danger of causing damage since the fastening devices usually manifest an element in the form of a pin and running through a hole in the lens taking the aspect of a screw or similar which causes high pressures and thus results in high tensions at the edge of the hold, this in turn leading to the lens' cracking or breaking. This disadvantages stand in contrast to the favorable properties of these known spectacles in that they are relatively light and are also aesthetically satisfactory since they are not very conspicuous.

This invention is based on the task of improving upon spectacles in accordance with this genre in such a manner that they will offer better possibilities for the subsequent adaptation of them to the face, head and ear shape of the wearer of the spectacles.

This task is solved according to the invention essentially by the fact that all individual components responsible for the mechanical cohesion of the spectacles, including if necessary any pin-shaped elements present of the fastening devices, are made out of plastics, whereby the hinge bolts in any event are not made of plastic. Preferably, however, even the hinge bolts will be made of plastic and the bridge mounts as well, so that the structural components of the spectacles in their entirety will be made of plastic with the exception of the spectacle lenses. The lenses can also be made of mineral glass in the usual manner in the spectacles according to this invention or of plastic glass.

Because of the design according to this invention all of the components determining the geometry of these spectacles, namely the bridge, the hinge pieces and the temple are made of plastic, which makes it possible subsequently to deform these structural components in a simple manner, for example, by supplying heat, and by this means to affect, for example, the angle of aperture, the angle of inclination, the width of the bridge and the length of the temple and to alter them. Added to these advantages comes the additional one through the fact that the spectacles according to this invention, given the same lenses, will have less weight than a traditional metal-fitting spectacles with metal components. In addition, there is the advantage that the pin-shaped element of the fastening devices present when indicated can also be made of plastic, through which means local heavy pressures which could cause the lens to fracture are prevented, so that the danger of breaking is as a whole diminished.

The best realization of this invention lies in the fact that the bridge, the two hinge pieces, the two temples and the four fastening devices—and, if necessary, including also the respective pin-shaped elements—are to be made of plastic and no core or inlays need be provided of metal. It should be stated that any components the surface of which has been metalized is to be considered as being made exclusively of plastic.

Plastic is widely known as a material for spectacles. It has been put in in so-called plastic frames in which the bridge, flanges and the eyewires completely surrounding the lenses are formed in one pice with one another and made of plastic. The concomitant temples are comprised exclusively or partially of plastic. In so-called combined frames the stressed components responsible for the mechanical cohesion of the spectacles are made of metal, whereby solely the less burdened components or those serving ornamental purposes are made of plastic. Even in so-called rimless spectacles in which the spectacle lenses are retained in the frame with the aid of a plastic thread and in which so-called beams together with the bridge are responsible for the supporting mechanical connection between the two temple hinges and flanges, these latter components and the temples in known spectacles are made exclusively of metal and what is made of plastic as an addition serves simply as ornamental parts.

The spectacles in accordance with this invention excel in the fact that they are constructed of the same components as they are known in the principle of the traditional metal-fitting spectacles, that these structural components—with the possible exception of the hinge bolts—are made of plastic. This means in other words that the principle of the metal-fitting spectacles, namely that of the mechanical connection between the bridge on the one hand and the repective hinges on the other being effected exclusively through the means of the lens, is realized in a novel manner with plastic structural components.

In an advantages preferred embodiment of this invention provision is made for the plastic in question to be polyetherimide or polyethersulfone.

Further advantages preferred embodiments of this invention are characterized in the dependent claims.

Figure 2:
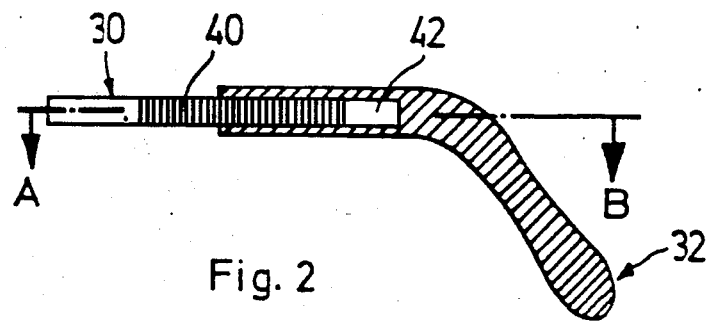
Figure 3:
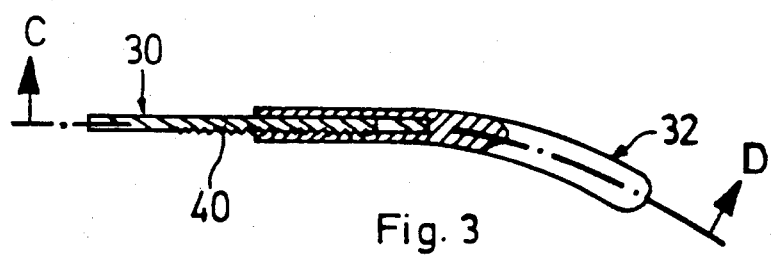

A preferred embodiment of this invention is depicted in the drawing and is explained in the following in greater detail. The following are shown:

FIG. 1, spectacles in perspective view seen diagonally from above and toward the front;

FIG. 2, an enlarged representation in cutaway section of a temple end piece in the section according to C-D in FIG. 3;

FIG. 3, a sectional representation according to A-B in FIG. 2; and

Figure 4:
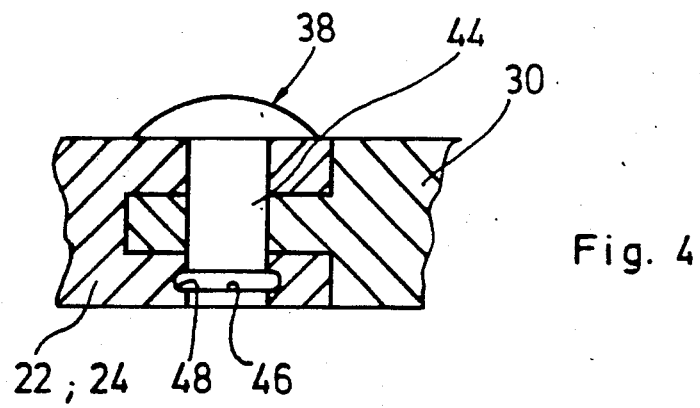

FIG. 4, an enlarged sectional representation of a hinge.

REFERENCE NUMERALS USED IN CHARTS AND DIAGRAMS

2: lens
4: lens
6: edge
8: bridge
10: fastening device
12: shank
14: support segment
16: element
18: bridge mounting
20: side bridge
22: hinge piece
24: hinge piece
26: temple
28: temple
30: temple shaft
32: temple end piece
34: hinge
36: hinge
38: hinge bolts
40: fine-tooth serration
42: insertion aperture
44: shaft
46: torus
48: slot The spectacles illustrated are comprised of two correcting lenses 2 and 4 made of plastic or mineral glass. Each one of these two lenses 2 and 4 has a border or edge 6 defining the perimeter shape of the lens.

Between areas facing one another of the two lenses 2 and 4 is situated a bridge 8, which is equipped at each of its two ends with a fastening device 10. The two fastening devices 10 serve the purpose of connecting the bridge with the two lenses 2 and 4. Each of the two fastening devices is comprised of a shank 12 arranged on the back side of the lenses 2 and 4 and a support segment 14, which extends along a certain stretch on the edge 6 and is located against it. The shank 12 and the support segment 14 of each fastening device 10 are formed in one piece with the bridge 8. An element 16 in the form of a pin runs through a hole, not shown, in the lenses 2 and 4 and is thickened on its front side in the shape of a ball; with this ball-shaped thickening it reposes in an analogous widening of the hole of the front side of each respective lens and is connected on the back side of the lens firmly with the shank 12. In this manner the pin-shaped element 16 firmly retains the spectacles lenses 2 and 4 in site on the shank 12 and on the support segment 14.

On the bridge 8 a bridge mounting is attached which merges downward into two side bridges 20. The two side bridges 20 have the task of supporting the spectacles on the nose of the wearer of the spectacles.

On the side of any one of the two lenses 2 and 4 facing away from the bridge 8 a hinge piece 22 and 24 has been arranged, on which one shackle toggle each has been formed. In addition, a fastening device 10 has been formed in one piece with each of the two hinge pieces 22 and 24 and these are identical in form with the two fastening devices 10 on the bridge 8. The fastening devices 10 on the hinge pieces 22 and 24 reposes each with their support segments 14 on the edge 10.

Each of the two hinge joints 22 and 24 is connected with a temple 26 and 28 in a joint. Each of the two temples 26 and 28 consists of a longitudinally extended temple shaft 30 and a temple end piece 32, which is connected with the back end of each respective temple end 30 and serves the purpose of going behind the ear of the spectacle wearer to fit against the skull and/or ear and thus to secure the spectacles in position.

One of the two temple end pieces 32 with the attaching temple shaft 30 is illustrated in cutaway section and enlarged in the FIGS. 2 and 3, together with the style of the connection. At the lower end, on the right as seen in FIGS. 2 and 3, of the temple shaft 30 a fine scoring or fine-tooth serration 40 has been formed. The teeth of this fine-tooth serration 40 run at right angles to the axis of the temple shaft 30, whereby the steeper flanks of the teeth point to the front, i.e. to the left as viewed in FIGS. 2 and 3. In the preferred embodiment shown the fine-tooth serration is located solely on one side of the temple shaft 30: it can, however, be formed on several sides or on any other of the sides illustrated of this temple shaft. In the front end, i.e. on the left as seen in FIGS. 2 and 3, of the temple shaft an insertion aperture 42 has been formed with smooth walls and is so dimensioned that the end of the temple shaft with the fine-tooth serration 40 can be shoved into the insertion aperture 42. The fine-tooth serration 40 thus meshes with the assigned smooth wall of dthe insertion aperture 42, which deforms by virtue of a cold-flow of the plastic material, so that ultimately a form-locking connection results. This type of connection has the advantage of affording a locking in position of the temple shaft 30 and the temple end piece 32 relative to one another in any position desired and not merely in discrete positions as defined by the serrations. In addition to this, it offers a simple way of determining the length of the temple since the temple end piece 32 can be shifted to the required degree onto the back end of the temple shaft 30 and the latter can furthermore be shortened. The insertion aperture 42 can as a variation from the preferred embodiment illustrated be equipped for its part with a fine-tooth serration.

On the front end of each of the two temples 26 and 28 a further shackle toggle joint, not shown, has been formed which, together with the two shackle toggle joints, not shown, of the adjoining hinge pieces 22 and 24, forms a hinge 34 and 36, whereby belonging to the hinge 34 and 36 is a hinge bolt 38 apiece, whereby this can be, for example, a hinge screw or hinge rivet. In the preferred embodiment illustrated a hinge rivet 38 have been employed, as shown in FIG. 4. The hinge rivet 38 has a smooth shaft 44, which is shaped at its lower end in the form of a circumferential torus 46 in one piece. In the lower of the two shackle toggle joints formed on the hinge piece 22 and 24 is circumferential slot has been, into which the torus 46 is snapped. In this manner the hinge bolt 38 in the form of a rivet is secured against unintentional loosening. This simple type of securing the hinge bolt is made possible, just as is the connection explained above between the temple end piece 32 and the temple shaft 30, by means of the use of a plastic material for the temple end piece 32 and the temple shaft 30 as well as for the hinge piece 22 and 24.

For the above description it will be seen that the spectacles are basically constructed in the manner of a traditional metal-fitting spectacles or glass spectacles, for which it is typical that the lenses 2 and 4 are clasped neither at the top nor at the bottom by an eyewire and that the mechanical and supporting connection between the bridge 8 and the hinge pieces 22 and 24 is formed exclusively by the glass of the lens 2 and 4 itself.

In the above described preferred embodiment of the spectacles as illustrated in the one single figure the bridge 8 and the elements formed on the bridge of the two fastening devices 10, i.e. the two shanks 12 and the two support segments 14, the two hinge pieces 22 and 24, including the elements formed on these hinge pieces of the adjoining fastening devices 10, i.e. including the support segment 14 and shank 12 formed on the hinge pieces 22 and 24, as well as the two temples 28 and 30, i.e. both temple shafts 30 and both temple end pieces 32, are all made of plastic. In addition to this, the two hinge bolts 14 and the four pin-shaped elements 16 of the four fastening devices 10, as well as the bridge mounting 18 and also the two side bridges 20, are made of plastic, so that the elements of the spectacles illustrated in their entirety (with the possible exception of the two lenses 2 and 4) will be exclusively made of plastic.

For this plastic preferably a polyetherimide or a polyethersulfone will come under consideration.

One preferred polyetherimide is comprised of the following repeating unit:

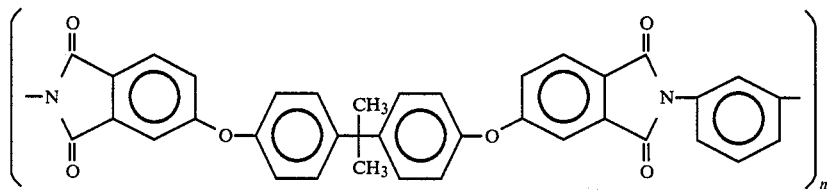

This polyetherimide is a heavily yellowish, amber-colored, transparent thermoplastic, which will preferably exhibit the following properties: a tensile strength, measured according to DIN 53455, of 90 to 140N/m$^2$; a stretching to the breaking point, measured according to DIN 53455, of 40 to 80%; a bending modulus, measured according to DIN 53457, of 2500 to 5000N/mm$^2$; an IZOD notch impact strength, measured according to ASTM D 2566, of 30 to 90 J/m; a vitreous temperature of 210° to 230° C.; a thermal mold stability of shape DTUL, measured at 1.82N/mm$^2$ according to ASTM D 648, of 190° to 210° C.: and a density, measured according to DIN 53479, of 1.10 to 1.50 Mg/m$^3$.

Suitable polyetherimide materials are described in the company brochure "Ultem", published by General Electric Plastics Europe. One especially preferable material is available commercially as the unreinforced polyetherimide "Ultem 1000", which is supplied by General Electric. However, the reinforced types can also be used.

Polyethersulfones are also known plastics as such, as they are described in, say, GB-PS Nos. 10 78 234 and 11 53 035. One suitable polyethersulfone within the scope of this invention exhibits the following repeating units:

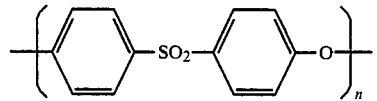

The above described polyethersulfone is a heavily yellowish, transparent, thermoplastic material, which will preferably have the following properties: a tensile strength at 20° C., measured according to DIN 53455, of 60 to 140N/mm$^2$; a stretching to the breaking point, measured according to ASTM D 638, of 30 to 90%; a bending modulus at 20° C., measured according to ASTM D 790, of 2000 to 6000N/mm$^2$; an IZOD notch impact strength, measured according to ASTM D 256 (6.4-mm testing body notched), of 60 to 100 J/m; a softening point according to Vicat, measured according to ASTM D 1525, of 210° to 230° C.: a thermal mold stability of shape DTUL, measured according to ASTM D 648, of 190° to 210° C.: and a density, measured according to ASTM D 792, of 1.20 to 1.50 Mg/m$^3$:

Suitable polyethersulfone materials are described in the company brochure "Victrex", Polyethersulfone, the High Temperature Resistant Technical Thermoplast, published by Imperial Chemical Industries, Ltd., 1979. The especially preferred materials are commercial available as Victrex 200 P and 300 P, representing the unreinforced types. However, the reinforced types can also be used.

As a variant of the above described preferred embodiment, the hinge bolts 38 can also consist of another plastic or a metallic material, whereby the above described formation in the same material as the adjoining temple shaft 30 and the adjoining hinge piece 22 or 24 is preferred.

As a variant of the above described preferred embodiment, the pin-shaped elements 16 of the fastening devices 10 can be made of another plastic, specifically by preference of an aromatic polyamide.

As a varient of the above described preferred embodiment, instead of side bridges 20 a saddle bridge can be provided for and the bridge material can be other than the above described plastic material. A softer material is preferred for the side bridges or saddle bridge, specifically especially thermoplastic polyurethane lastomer.

In addition to this, other component parts structurally and mechanically different can be employed. For example, the fastening devices 10 need not be those depicted and explained in the illustration. These fastening devices can also be designed as traditional clasps or any other manner as long as they fulfill the desired function, namely that of connecting the adjoining component part (bridge 8 or hinge piece 22 and 24) firmly to the relevant spot on the lens 2 and 4. In addition to fastening devices bringing about a form-locking connection, such fastening devices can also be considered that produce a cemented connection. And finally, all four of the fastening devices need not have the same identical design; instead, the two fastening devices 10 on the bridge can has a different design than the two fastening devices 10 on the hinge pieces.

Because of the plastic construction of at least all those parts which determine the geometry of the spectacles, viz. the width of the bridge, the breadth of the central portion, the length of the temple, the angle of aperture, and the angle of inclination, the described spectacles permit of a relatively simple adaptation of the already completed and assembled spectacles to the individual requirements of the spectacle wearer, i.e. in particular the wearer's nose and face shape, as well as location of ear, shape of skull, and form of the furrow behind the ear since these components made of plastic can, for example, be deformed plastically permanent by a sight application of heat.

Spectacles of the so-called metal-fitting type exhibits, in addition to the spectacle lens, a bridge, two temples, two hinge pieces for the two temples, fastening devices for connecting the bridge and the hinge pieces to the lenses, and at least one bridge and a bridge mounting, whereby the mechanical, supporting connection between the bridge and the hinge pieces alone secures the spectacle lenses intermediately situated, and no eyewires are present. With the possible exception of the lenses, in these spectacles all the components determining its geometry are made of plastic. By comparison to the traditional metal-fitting spectacles, in which these structural components are all made of metal, these new spectacles are lighter, safer from breaking and susceptible of being fitted to the wearer in a simple fashion.

I claim:

1. Rimless spectacles for correction purposes comprises a central portion and two side components,
   a. said central portion including two lenses, a bridge, fastening devices for connecting the bridge with one each of the respective lenses, two side bridges or one saddle bridge, and bridge supports for connecting the bridge with the side bridges or the saddle bridge;
   b. each side component including a hinge piece, a fastening device for connecting the hinge piece with one of the two lenses, a hinge bolt and a temple having a temple end piece which goes beyond the ear;
   c. each hinge piece being engaged with the associated temple via at least one hinge eye and the hinge bolt penetrating it; and
   d. the bridge, the fastening devices, the two hinge pieces and the two temples being made substantially of synthetic plastic material selected from the group consisting of polyetherimide and polyethersulfone.

2. Spectacles according to claim 1, wherein said hinge bolts are also made of plastic.

3. Spectacles according to claim 1, wherein said plastic is a polyetherimide which exhibits the following repeating unit:

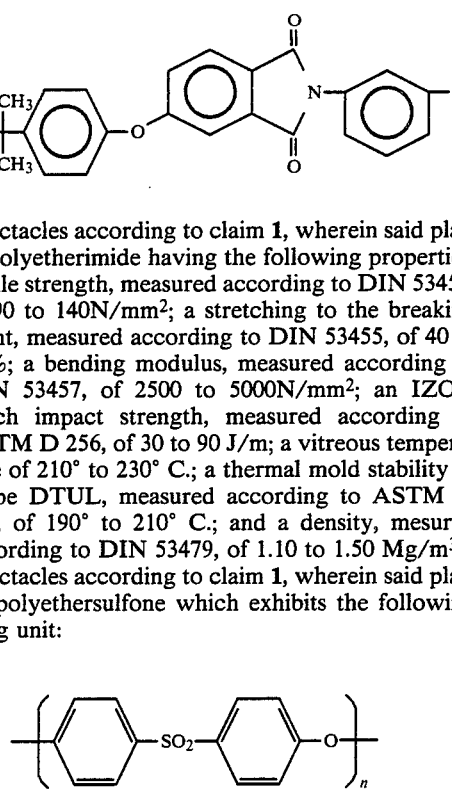

4. Spectacles according to claim 1, wherein said plastic is a polyetherimide having the following properties: a tensile strength, measured according to DIN 53455, of 90 to 140N/mm$^2$; a stretching to the breaking point, measured according to DIN 53455, of 40 to 80%; a bending modulus, measured according to DIN 53457, of 2500 to 5000N/mm$^2$; an IZOD notch impact strength, measured according to ASTM D 256, of 30 to 90 J/m; a vitreous temperature of 210° to 230° C.; a thermal mold stability of shape DTUL, measured according to ASTM D 648, of 190° to 210° C.; and a density, mesured according to DIN 53479, of 1.10 to 1.50 Mg/m$^3$.

5. Spectacles according to claim 1, wherein said plastic is a polyethersulfone which exhibits the following repeating unit:

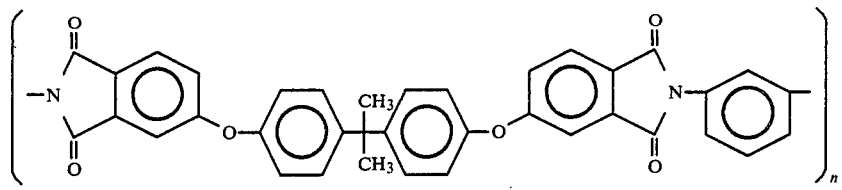

6. Spectacles according to claim 1, wherein said plastic is a polyethersulfone which exhibits the following properties:
a tensile strength at 20° C., measured according to DIN 53455, of 60 to 140N/mm$^2$; a stretching to the breaking point, measured according to ASTM D 638, of 30 to 90%; a bending modulus at 20° C., measured according to ASTM D 790, of 2000 to 6000N/mm$^2$; an IZOD notch impact strength, measured according to ASTM D 256 (6.4-mm testing body notched), of 60 to 100 J/m, a softening point according to Vicat, measured according to ASTM D 1525, of 210° to 230° C.; a thermal form stability of shape DTUL, measured according to ASTM D 648, of 190° to 210° C.; and a density. measured according to ASTM D 792, of 1.20 to 1.50 Mg/m$^3$.

7. Spectacles according to any one of claims 3 through 6, wherein the surface of the plastic is pigmented or metalized.

* * * * *